United States Patent
Miksitz

Patent Number: 5,769,169
Date of Patent: Jun. 23, 1998

[54] SOIL IRRIGATION AND AERATION APPARATUS

[76] Inventor: Frank J. Miksitz, 603 Barrymore St., Phillipsburg, N.J. 08865

[21] Appl. No.: 784,917

[22] Filed: Jan. 16, 1997

Related U.S. Application Data

[63] Continuation-in-part of Ser. No. 617,209, Mar. 18, 1996, abandoned.

[51] Int. Cl.$^6$ ................................................. A01B 45/02
[52] U.S. Cl. ............................................. 172/21; 111/128
[58] Field of Search ................................. 111/127, 128, 111/130, 52, 200; 172/21, 22

[56] References Cited

U.S. PATENT DOCUMENTS

| | | | |
|---|---|---|---|
| 2,072,165 | 3/1937 | Fow | 47/9 |
| 2,072,331 | 3/1937 | Hanna | 111/128 X |
| 2,145,934 | 2/1939 | Kingman | 47/48 |
| 2,649,061 | 8/1953 | Hawkins et al. | 111/128 |
| 2,975,735 | 3/1961 | Purvance | 111/128 |
| 3,025,806 | 3/1962 | Peck | 111/128 |
| 3,151,415 | 10/1964 | James | 47/48.5 |
| 3,881,553 | 5/1975 | Angeski | 172/22 |
| 3,914,900 | 10/1975 | Bigelow et al. | 47/9 |
| 3,934,390 | 1/1976 | Ballard | 172/21 X |
| 4,109,865 | 8/1978 | Hurtado et al. | 111/128 X |
| 4,115,951 | 9/1978 | Becker et al. | 47/81 |
| 4,153,380 | 5/1979 | Hartman | 405/39 |
| 4,381,623 | 5/1983 | Koistinen | 47/48.5 |
| 4,677,921 | 7/1987 | Brown | 111/128 |
| 4,858,697 | 8/1989 | Sherblom | 172/21 |
| 4,919,060 | 4/1990 | Cady | 111/128 |
| 5,178,078 | 1/1993 | Pendergrass | 111/128 |
| 5,353,724 | 10/1994 | Wheeley, Jr. | 172/21 X |
| 5,398,445 | 3/1995 | Lemons | 47/48.5 |

FOREIGN PATENT DOCUMENTS

| | | |
|---|---|---|
| 2605837 | 5/1988 | France . |
| 1716994 | 3/1992 | U.S.S.R. . |

*Primary Examiner*—Terry Lee Melius
*Assistant Examiner*—Robert Pezzuto
*Attorney, Agent, or Firm*—Roylance, Abrams, Berdo & Goodman, L.L.P.

[57] ABSTRACT

An irrigation and aeration device includes a drum having a plurality of probes for penetrating the ground and injecting water into the soil. The probes are made from stainless steel spring pins having an elongated slot and an open outer end. The drum includes a plurality of compartments for receiving water from a supply and a valve assembly for selectively dispensing the water to the compartments. The valve assembly can be actuated by a foot contacting the ground, a valve actuated by rotation of the drum, or a solenoid actuated valve.

25 Claims, 11 Drawing Sheets

SOIL IRRIGATION AND AERATION APPARATUS

CROSS-REFERENCE TO RELATED APPLICATION

This application is a continuation-in-part application of Ser. No. 08/617,209, filed Mar. 18, 1996, now abandoned.

FIELD OF THE INVENTION

The present invention is directed to an apparatus for irrigating and aerating soil. More particularly, the invention relates to an apparatus having a ground engaging drum having a plurality of prongs penetrating the ground for irrigating and aerating the soil.

BACKGROUND OF THE INVENTION

Numerous irrigation devices have been proposed in the past for dispensing water or aqueous solutions to the ground to promote plant growth. Many of these devices apply the water directly to the surface of the ground. A disadvantage of this type of irrigation device is that the water often runs off the surface before it has an opportunity to penetrate the soil. In addition, large amounts of water are lost to evaporation before the water soaks into the soil.

It is also highly desirable to aerate the soil to promote growth of microorganisms which decompose dead vegetable matter thereby providing nutrients to the soil. Soil aeration is usually accomplished by plowing or tilling the soil. This is an acceptable procedure for fields where new crops are to be planted and grown. However, for grasses, such as lawns or golf courses, plowing is not a suitable means for aerating the soil. The typical method for aerating the soil where grasses are actively growing is to insert a pronged device into the soil to form a multitude of spaced-apart holes. These devices are often difficult to use and are only marginally effective.

Lawns, such as golf courses, sometimes develop dry areas where water and nutrients do not adequately penetrate the soil. These areas usually are visible as brown or discolored spots in the vegetation. Several systems have been proposed for treating these selected areas. One example is disclosed in U.S. Pat. No. 5,398,445. As disclosed therein, the device includes a base having a number of probes extending downwardly. The probes include a number of holes along the sides to direct water into the ground. A disadvantage to this type of device is the manual operation of the device. The device is used by the operator standing on the base to force the probes into the soil. The base is then lifted manually to a new location and again inserted into the soil. On hard or compacted soil it may not be possible to insert the device into the soil and once inserted, may be difficult to remove.

Various other devices have been produced for irrigating soil where the devices include a probe inserted into the soil. Examples of these devices are found in French Patent No. 2,605,837, U.S. Pat. No. 3,151,415, U.S. Pat. No. 4,115,951, U.S. Pat. No. 2,145,934, U.S. Pat. No. 3,914,900, U.S. Pat. No. 2,072,165, U.S. Pat. No. 4,381,623 and U.S. Pat. No. 4,153,380. These devices are intended for use in container grown plants where a constant moisture level is desired. These devices are not suitable for large scale irrigation and aeration.

Accordingly, there is a continuing need in the field for an efficient and effective apparatus which is able to irrigate and aerate the soil.

SUMMARY OF THE INVENTION

The present invention is directed to an irrigation and aeration device which can be operated manually or pulled by a vehicle such as a tractor or truck. Accordingly, a primary object of the invention is to provide a device for effectively and efficiently irrigating and aerating soil.

A further aspect of the invention is to provide an irrigation and aeration device having a plurality of prongs for injecting water into the soil as the device is moved over the ground. The prongs are structured to resist breakage and resist clogging from the soil while allowing water to penetrate the soil.

Another aspect of the invention is to provide an irrigation and aeration device having drum with a plurality of probes extending therefrom and a valve assembly for selectively supplying water to the probes which are in contact with the ground.

The various aspects of the invention are basically attained by providing a soil irrigation and aeration device comprising a rotatable ground engaging drum having an outer wall and an inner wall spaced from the outer wall and a plurality of compartments disposed between said inner and outer walls around a circumference of the drum, said compartments having a length substantially equal to a length of said drum; a plurality of probes extending radially outward from the drum, each of the probes having a cylindrical side wall defining a substantially tubular shape with a slot in said side wall extending longitudinally from a first inner end in communication with an interior of one of the compartments to a second open outer end; a water source connected to the drum; and a valve assembly coupled to said inner wall of each compartment for selectively supplying water under pressure to the compartments sequentially when the probes and compartments are in a selected position.

The aspects and objects of the invention are also attained by providing a soil irrigation and aeration device comprising a frame; a ground engaging drum rotatably mounted on the frame, the drum having an outer wall, an inner wall and a plurality of compartments disposed circumferentially around the drum between the inner and outer walls, said compartments having a length substantially equal to a length of said drum; a water source for supplying water to each of the compartments; a valve assembly coupled to said inner wall and connected to the water source and each of the compartments for selectively supplying water to the compartments; a plurality of probes extending radially outward from the drum, each of the probes having a substantially tubular shape with a slot extending longitudinally from a first end in communication with one of said compartments and a second outer end for penetrating the soil.

The aspects and objects are further attained by providing a soil irrigation and aeration device comprising: a frame having a hollow fixed first shaft mounted on the frame and coupled to a water supply, the first shaft having a plurality of holes extending radially through the shaft for dispensing water, each of the holes extending in a downward direction with respect to the ground and being spaced in a line extending longitudinally along a longitudinal axis of the first shaft; a ground engaging drum having a hollow centrally located second shaft rotatably mounted on the first shaft, the second shaft having a plurality of longitudinally spaced-apart holes for cooperating with a respective hole in the first shaft, wherein the holes in the second shaft align with a cooperating hole in the first shaft during a predetermined angle of rotation of the second shaft with respect to the first shaft for dispensing water through the holes; the drum further including an outer wall and an inner wall spaced from the outer wall, a plurality of radial walls extending from the inner wall to the outer wall and defining a plurality of circumferentially disposed compartments, each of the compartments having a length substantially equal to a length of the drum, the inner wall having at least one aperture communicating with each of the compartments; a plurality of conduits, each conduit having a first end coupled to one of the apertures communicating with one of the compartments, and a second end coupled to one of the apertures in the second shaft for supplying water to the compartment; a plurality of first annular seals mounted around the first shaft, each of the first annular seals disposed on opposite sides of the holes in the first shaft, the first seals forming a substantially fluid tight seal between the first and second shafts; and a plurality of probes extending radially outward from an outer surface of the drum, the probes having a cylindrical side wall defining a substantially tubular shape with a slot in the side wall extending longitudinally from a first inner end in communication with an interior of one of the compartments to a second open outer end for injecting water into the ground.

These and other objects, advantageous and salient features of the invention will become apparent from the following detailed description, which, taken in conjunction with the annexed drawings, discloses various and preferred embodiments of the invention.

BRIEF DESCRIPTION OF THE DRAWINGS

Referring to the drawings which form a part of this original disclosure.

DETAILED DESCRIPTION OF THE INVENTION

The present invention is directed to an apparatus 10 for irrigating and aerating soil. The apparatus 10 includes a frame 12, a ground engaging drum 14, a valve assembly 16 for dispensing water, and a plurality of probes 18 extending from the drum for piercing the soil and dispensing water to the soil. The apparatus 10 is designed for moving across the surface of the ground so that the probes 18 pierce the soil sufficiently to aerate the soil without damaging the turf. Simultaneously, the probes 18 inject water or other fluids into the soil to irrigate the soil below the surface and inject water to the roots of the turf.

The apparatus is suitable for large and small areas and can be manually operated or pulled by a suitable vehicle. The apparatus is preferably made of durable but corrosion resistant materials. Examples of suitable materials can include aluminum, brass, stainless steel and various plastic materials.

Figure 1:
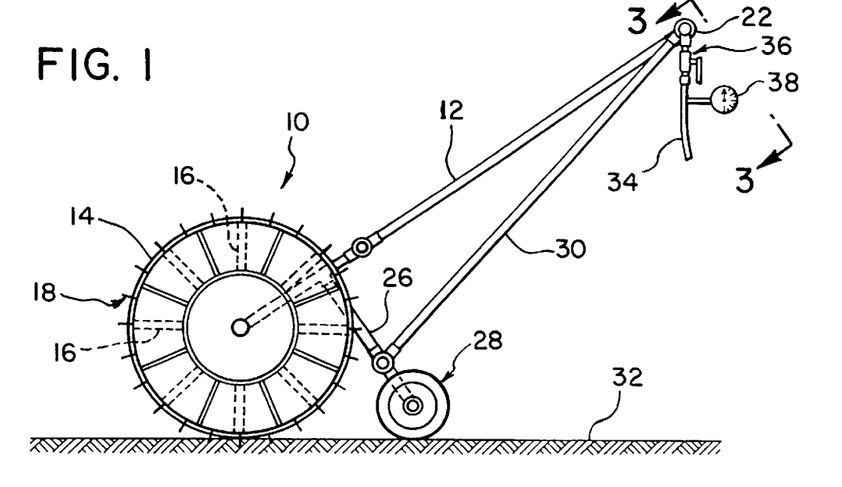
FIG. 1 is a side elevational view of the irrigation and aeration device in a first embodiment of the invention and showing the drum in partial cross section.
Figure 2:
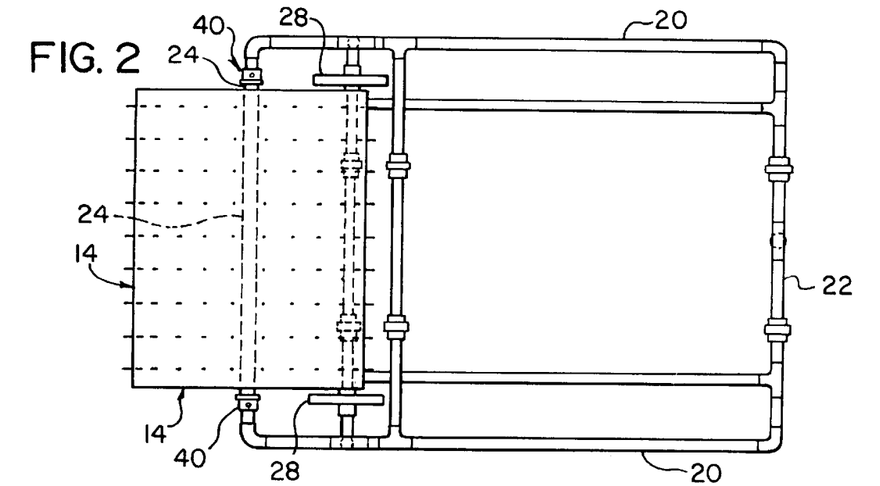
FIG. 2 is a top plan view of the device of FIG. 1.
Figure 3:
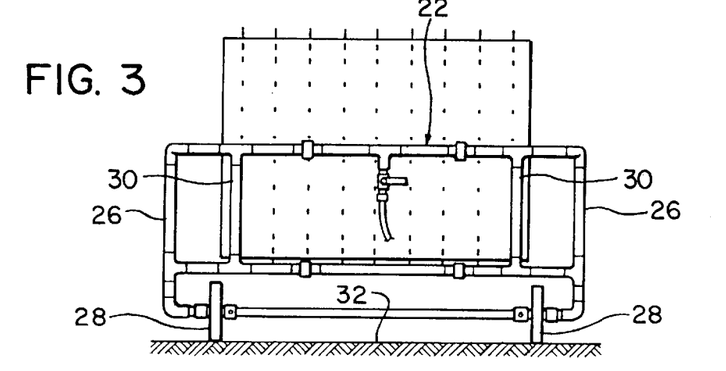
FIG. 3 is a rear side elevational view of the device of FIG. 1 taken along line 3—3 of FIG. 1.

Referring to FIGS. 1–3, frame 12 is made from a plurality of sections of conduit material and includes side portions 20 and a handle 22. The various sections can be welded together or secured by various coupling devices. An axle 24 extends between side portions 20 for receiving and supporting the drum 14. Frame 12 also includes a pair of legs 26 extending toward the ground. A pair of ground engaging wheels 28 are mounted on the legs 26. A brace 30 extends from the legs 26 to the frame 12 to strengthen the legs 26. As shown in FIG. 1, the apparatus 10 is moved along the ground 32 with multiple side by side wheels 28 on the same shaft to possibly roll down and loosen turf with drum 14 moving over the ground. Wheels 28 can also act as a fulcrum as shown in FIG. 1 by pressing downwardly on handle 22 to lift the drum 14 from the ground. In this manner, the drum can be lifted and the apparatus moved to another location without the drum 14 and the probes 18 contacting the ground. In practice, it is preferable to include a protective shield or guard (not shown) spaced from the drum 14 to prevent injury to the user by the probes 18.

A water supply 34, such as a hose, is connected to the handle 22 to feed water through the frame and to the axle 24. In the embodiment illustrated, the handle 22, side portions 20 and axle 24 are hollow and function as a conduit for the water supply. A manually operated valve 36 is provided to control the flow of water from the supply 34 to the apparatus. A flow meter 38 is also included to assist the operator in dispensing the desired amount of water to the soil. Water under pressure is fed from the water supply 34 through the side portions 20 of the frame to the axle 24. As shown in FIG. 2, axle 24 is connected to the frame 12 by a swivel coupling 40 so that the axle 24 rotates with respect to the frame 12. In this embodiment, the axle 24 is fixed to the drum 14.

Figure 4:
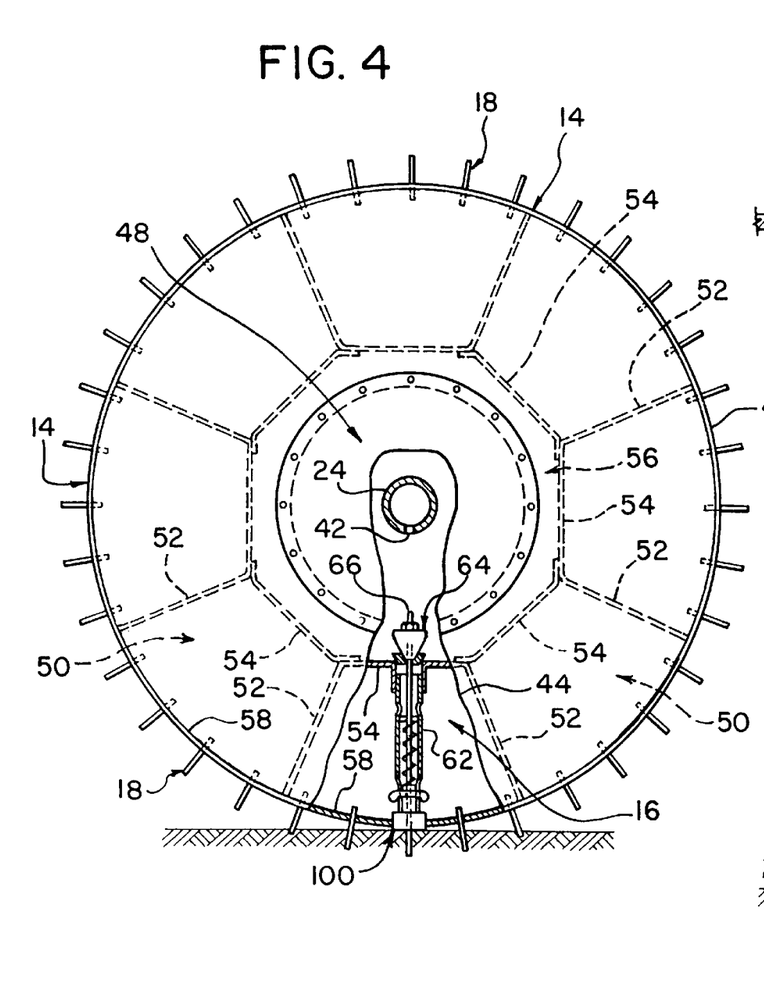
FIG. 4 is a side elevational view in partial cross section of the drum showing the valve assembly in a first embodiment.
Figure 5:
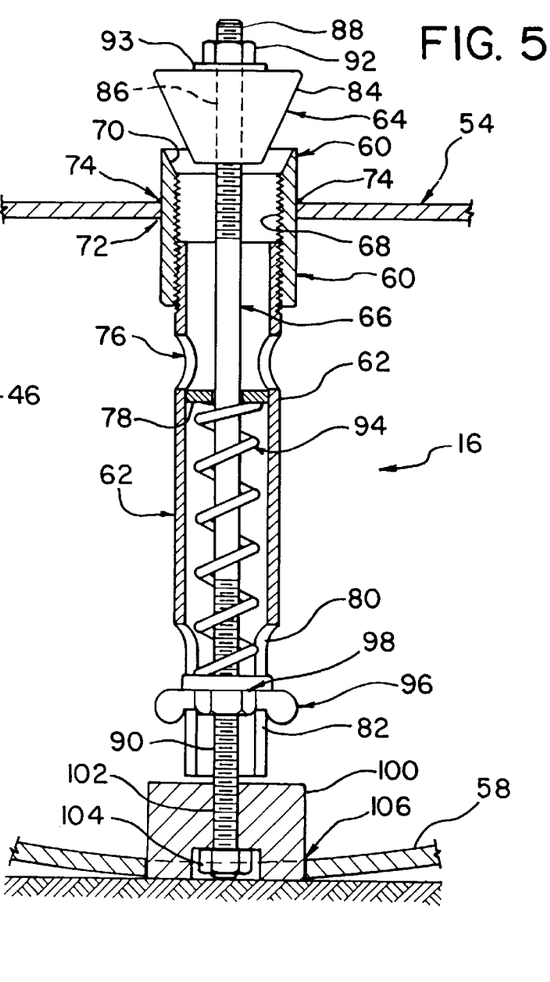
FIG. 5 is a cross sectional side view of the valve assembly of FIG. 4.

Referring to FIGS. 4 and 5, drum 14 has a substantially cylindrical shape with the axle 24 extending through the center. As shown in FIG. 4, axle 24 is a tubular conduit having one or more outlets 42 for supplying water to the interior of the drum. Drum 14 includes side walls 44 which are recessed slightly from the outer edge 46 of the drum. A removable center panel 48 is attached to the side walls 44 to allow access to the interior of the drum 14 for maintenance and installation of the valve assemblies 16. Side walls 44 are attached to the drum by any suitable means such as, for example, welding or riveting in a water tight manner.

The interior of the drum 14 is divided into a plurality of compartments 50 as shown in FIG. 4. In the embodiment illustrated, eight compartments are shown, however, the actual number of compartments may vary depending on the size of the drum and the intended use. The compartments 50 are formed by a plurality of side walls 52 extending radially inward from the outer edge of the drum 14 and an inner wall 54. Side walls 52 and inner wall 54 extend across the entire width of the drum 14 and are attached to side walls 44 in a substantially water tight manner. Inner wall 54 defines a reservoir 56 in the interior of the drum to receive water being fed from the axle 24 through outlet 42.

As shown in FIG. 5, valve assembly 16 extends between the inner wall 54 and the outer wall 58 of the drum 14. Valve assembly 16 includes a collar 60, a sleeve 62, a valve 64, and valve stem 66. The valve stem 66 acts as an actuator rod for the valve 64. The collar 60 includes an internally threaded portion 68 and a conical valve seat 70. As shown in FIG. 5, collar 60 extends through an aperture 72 in the inner wall 54. Preferably, the collar 60 extends about ¼" towards the center of the drum 14 although the distance can vary depending on the length of the valve assembly. Collar 60 is attached to the inner wall 54 by welds 74 or other suitable means in a water tight manner.

Sleeve 62 has a threaded end which is threaded to collar 60 at a lower end. A pair of transverse holes 76 are included on the opposite side of the wall of the sleeve 62. An annular stop member is positioned in the sleeve 62 and positioned below the holes 76 by welding or other suitable means. The lower end 80 of sleeve 62 includes an elongated slot 82 extending from the lower end towards the upper end.

Valve 64 has a frustoconical shape having a valve face 84 and an axial passage 86 receiving the valve stem 66. Valve stem 66 has a threaded upper end 88 and a threaded lower end 90. The upper threaded end 88 of valve stem 66 passes through the valve 64 and is attached thereto by a nut 92 and washer 93. In preferred embodiments, the axial passage 86 is threaded to couple with the threaded upper end 88 of the valve stem 66. A coil spring 94 surrounds valve stem 66 with an upper end contacting the stop member 78. A wing nut 96 is coupled to the lower end 90 of the valve stem 66 to compress the spring 94 against the stop member 78 and adjust the tension necessary to open the valve 64. A washer 98 is positioned between the spring 94 and wing nut 96 as shown. A foot 100 having an axial passage 102 is attached to the lower end 90 of the valve stem 66 by a nut 104. As shown, the foot 100 slides axially through the hole 106 in the outer wall 58 of the drum 14. Preferably, the axial passage 102 is threaded to couple with the lower end of the valve stem 66.

The valve assembly 16 is constructed with the valve sleeve 62 threaded to the collar 60 with the valve stem 66 passing axially through the sleeve 62. The spring 94 is placed on the valve stem 66 to abut the stop member 78. Washer 98 and wing nut 96 are then threaded to the lower end of valve stem 66 to compress the spring 94. In the assembled position, wing nut 96 slides axially in the slot 82 to prevent rotation of the wing nut 96 with respect to the valve stem 66. As can be seen, the length of slot 82 and the position of the wing nut 96 on the valve stem 66 limits the axial movement of the valve stem 66 and valve 64. The spring 94 normally biases the valve 64 in the closed position. As the drum rotates over the ground and the foot 100 engages the ground, the valve stem 66 is pushed upwardly to open the valve 64 and allow water to flow from the reservoir 56 into the respective compartment 50. In this manner, water flows into the respective compartment only when that compartment and the respective valve assembly 16 is adjacent the ground.

Figure 9:
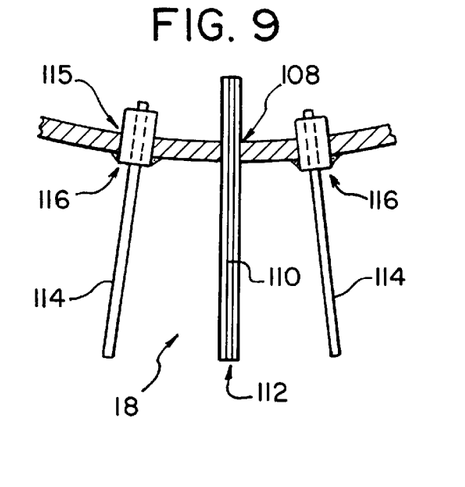
FIG. 9 is a cross sectional view of the drum showing the irrigation probe in a first embodiment.

Referring to FIG. 9, the probes 18 extend through an aperture 108 in the outer wall 58 of the drum 14. The probe 18 of FIGS. 4 and 9 has a substantially tubular shape with an elongated slot 110 shown on FIG. 9 extending the full length of the probe. The probe 18 also has a substantially C-shaped cross section with an open end 112 for penetrating the ground. In preferred embodiments of the invention, the probe 18 is a stainless steel spring pin as known in the art which is press fitted into the aperture 108. During use, the probe 18 penetrates the ground and water under pressure is injected into the ground through the slot 110 and the open end 112.

A standard spring pin is particularly suitable for use in constructing the probes 18. Spring pins are inexpensive and readily available and can be easily replaced when broken or damaged. Spring pins are also available in a variety of lengths and widths. In embodiments of the invention, the spring pin has a length of about 1 to 4 inches and a diameter of up to ¼ inch.

In the embodiment illustrated in FIG. 9, spikes 114 are mounted adjacent to the probes 18. Each spike 114 is attached to a collar 116 which is welded to the outer surface of the drum but extends through an aperture 115 in the outer wall 58 of the drum 14. The spikes can be welded to the collar or attached by other suitable coupling means. The spikes 114 have a length substantially the same as the probes 18. On hard surfaces, the spikes 114 prevent damage to the probe when the drum engages rocks or other hard objects. On softer surfaces, the spikes 114 penetrate the ground to further aerate the soil.

Figure 10:
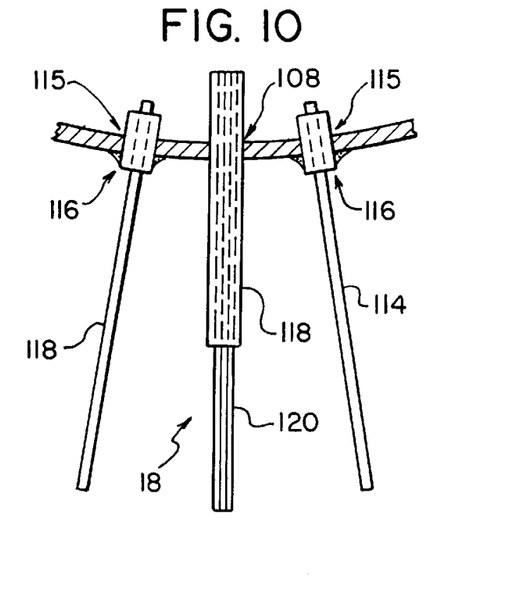
FIG. 10 is a cross sectional view of the drum showing the irrigation probe in a second embodiment of the invention.

The length of the probes 18 can be increased using standard spring pins as shown in FIG. 10. A first large spring pin 118 is inserted through the aperture 108 in the drum as in the embodiment of FIG. 9. A second spring pin 120 is then press fitted in the end of the first spring pin 118. In this embodiment, the spring pins can be removed when damaged and replaced with a new spring pin without disassembly of the device.

Figure 11:
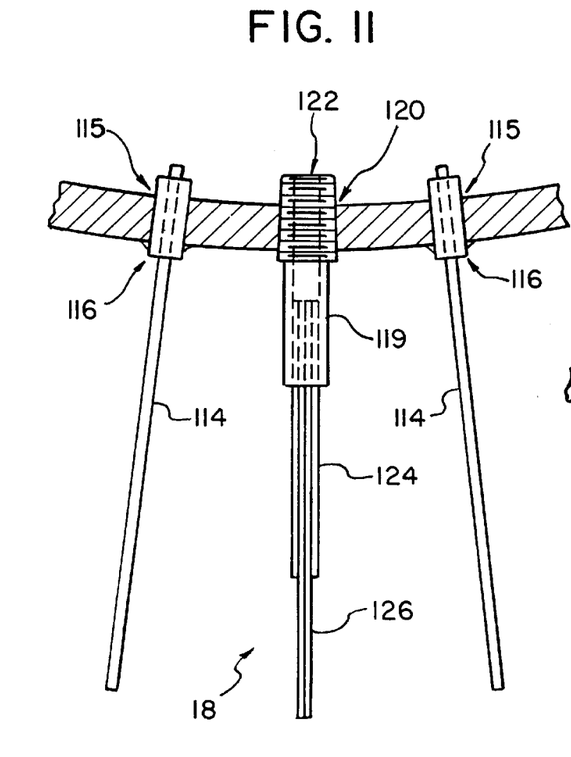
FIG. 11 is a partial cross sectional view of the drum showing the irrigation probe in a third embodiment of the invention.
Figure 12:
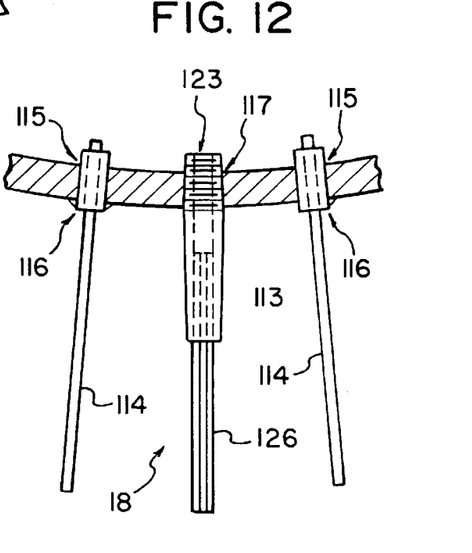
FIG. 12 is a partial cross sectional view of the irrigation probe in a fourth embodiment of the invention.

In a further embodiment illustrated in FIGS. 11 and 12, a threaded collar 119 and 113 is threaded into a hole 120 and 117, respectively, in the outer wall of the drum. The collars 113 and 119 include an axial passage 122 and 123 to receive a first spring pin 124 and 126, respectively. In this embodiment, a second spring pin 126 is press fitted into the first spring pin 124 in collar 119 to increase the overall length of the probe. In the embodiment illustrated in FIG. 12, a single spring pin 126 is press fitted into the collar 113.

In embodiments of the invention, the spring pins are press fitted into the drum. This provides a convenient and inexpensive means for removing and replacing the spring pins when needed. In addition, since the spring pins are press fitted, the pins can slide or retract into the drum when the spring pins strike a hard surface, thereby reducing the risk of damage or breakage of the spring pin.

Figure 16:
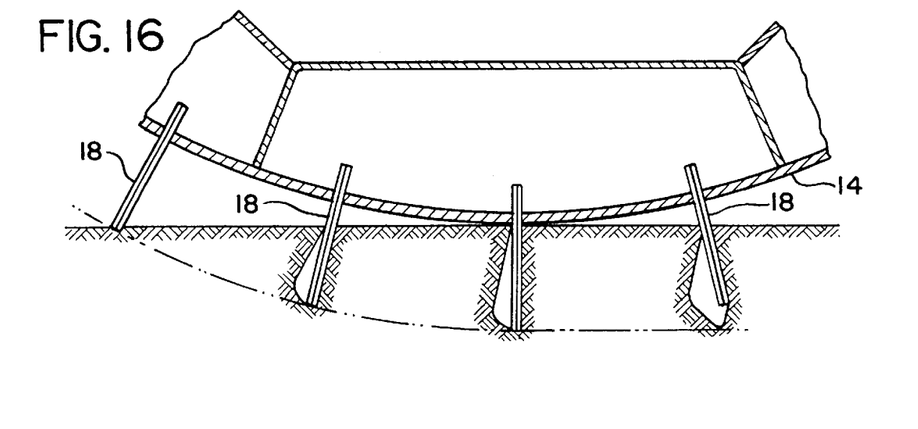
FIG. 16 is a partial side elevational view in cross-section showing the probes penetrating the soil.

Referring to FIG. 16, the spring pin penetrates the ground and forms a cavity around the tip of the probe as the drum rolls over the ground. The pocket or cavity in the ground around the tip provides a space for the water to flow from the spring pin where it can soak into the soil.

Figure 6:
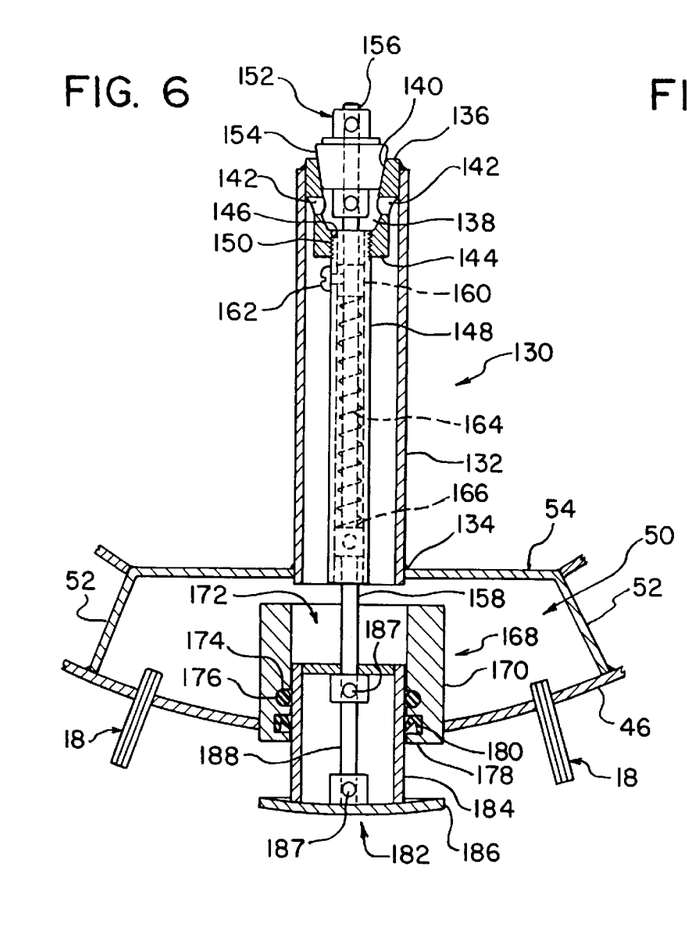
FIG. 6 is a cross sectional side view of a valve assembly in a second embodiment of the invention.

Referring to FIG. 6, a further embodiment of the valve assembly is illustrated. The valve assembly 130 includes a sleeve 132 extending through the opening 72 in inner wall 54 and secured thereto by a weld 134 or other suitable water tight means. A collar 136 is welded to the upper end of sleeve 132. The collar 136 includes an axial passage 138 defining a valve seat 140. A pair of openings 142 extend transversely through the collar 136 into the axial passage 138. A lower end 144 of collar 136 includes a threaded portion 146. An inner sleeve 148 having a threaded upper end 150 is coupled to the threaded portion 146 of the collar 136. In the embodiment illustrated, the inner sleeve 148 has a length substantially the same as sleeve 132.

A valve 152 having a valve face 154 mates with the valve seat 140 in the collar 136. Valve 152 includes an axial passage 156 for receiving a valve stem 158. An annular collar 160 is positioned within the inner sleeve 148 and is secured thereto by a screw 162. A spring 164 is positioned within the inner sleeve 148 to abut the inner collar 160. A lower collar 166 is fixed to the valve stem 158 by a screw to engage the lower end of the spring 164.

A foot assembly 168 is coupled to the outer wall of the drum and includes an annular sleeve 170 welded to the outer wall of the drum and having an axial passage 172. The inner surface of axial passage 172 includes a first annular recess 174 receiving an O-ring 176 and a second annular recess 178 receiving an annular compression seal 180. A foot 182 having a cylindrical body portion 184 reciprocates within the axial passage 172 of the sleeve 170. An enlarged base 186 is coupled to the annular body portion 184 for engaging the ground. The distal end of valve stem 158 is coupled to the annular body portion 184 by set screws 187 or other suitable means.

In operation, the drum rotates over the ground so that the foot 182 engages the ground to actuate the valve stem 158, thereby opening the valve assembly 130 allowing water to pass from the center of the drum into the compartment 50 and outwardly through the probes 18. The O-ring 176 and seal 180 prevent dirt from entering the valve assembly 130. As the foot 182 leaves the ground upon rotation of the drum, the spring 164 biases the valve 152 to the closed position and pushes the foot 182 outwardly from the drum.

Figure 7:
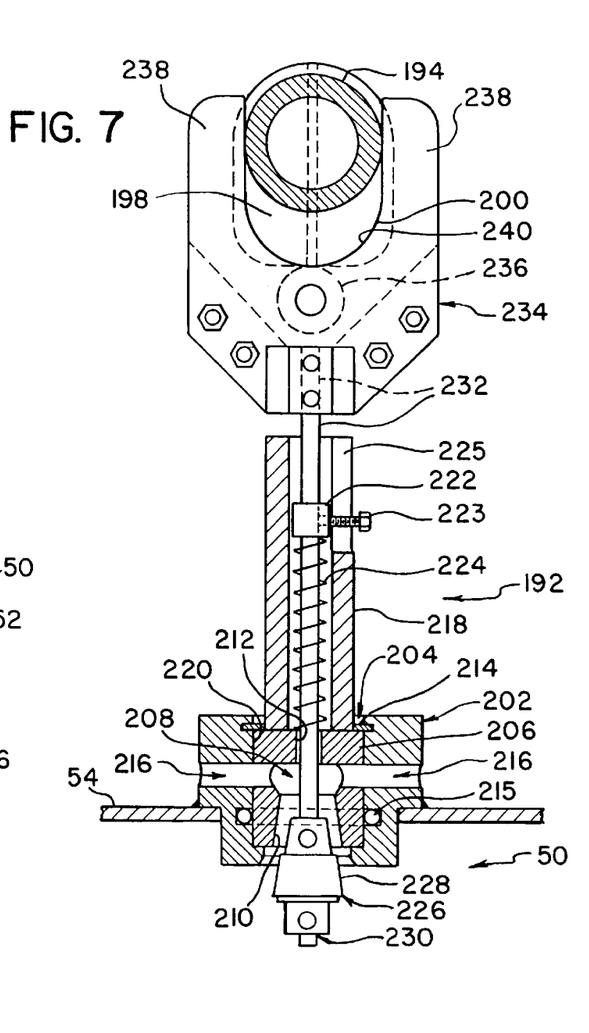
FIG. 7 is a partial cross sectional side view of the valve assembly in a third embodiment of the invention.
Figure 8:
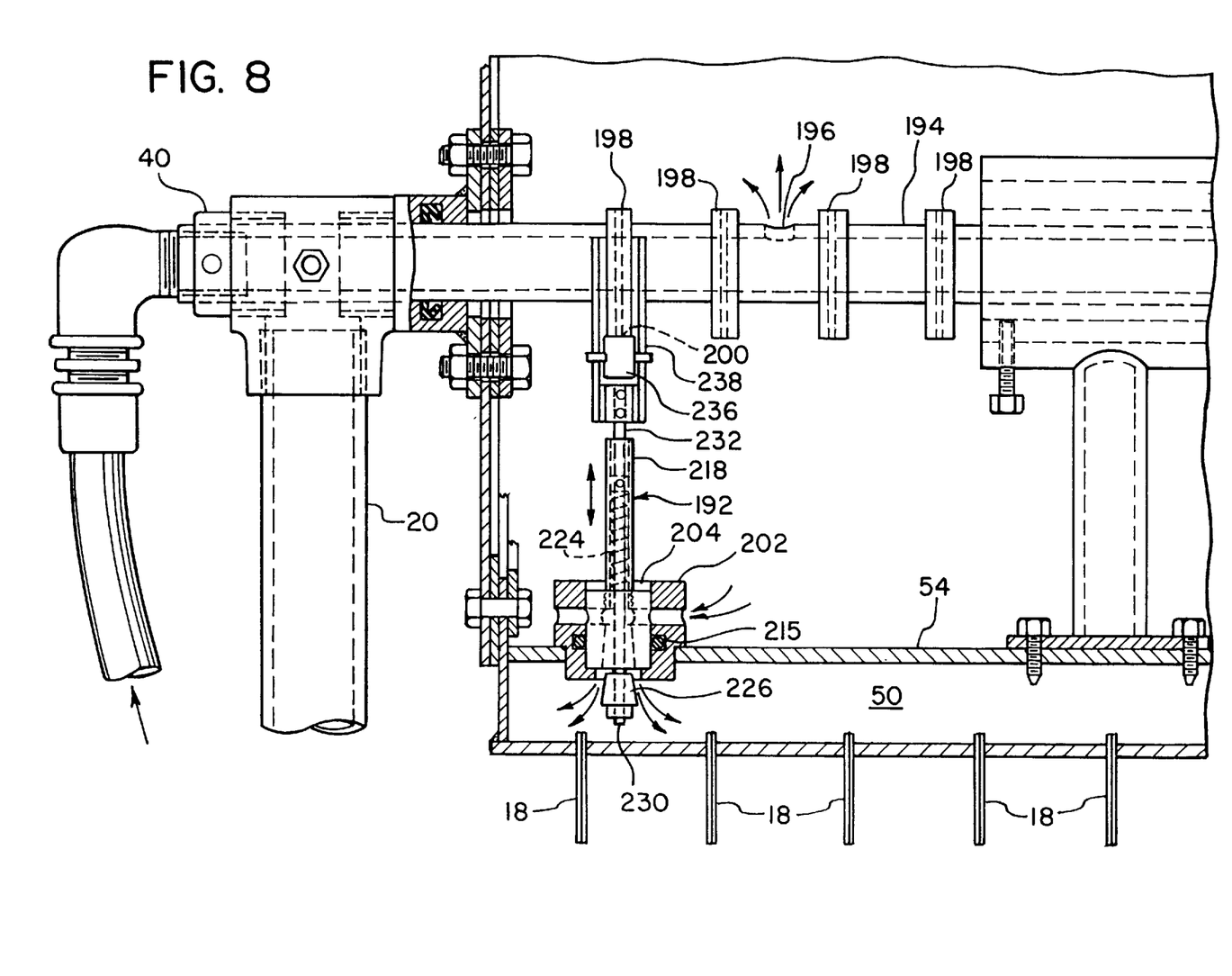
FIG. 8 is a partial side elevational view of the valve actuating mechanism of the valve assembly of FIG. 7 showing the drum in partial cross section.

Referring to FIG. 7 and 8, a further embodiment of the valve assembly 192 is shown. In this embodiment, the drum axle 194 is fixed such that the drum rotates about the axle 194. Axle 194 is hollow to receive water from the supply which enters the drum through an opening 196 in the axle. A cam member 198 is fixed to the axle 194 having a cam surface 200 for actuating the valve assembly 192.

Valve assembly 192 further includes an annular collar 202 welded to the inner wall 54 of the drum 14. Annular collar 202 includes an axial passage 204 which receives an inner collar 206. Inner collar 206 includes an axial passage 208 defining a valve seat 210 and a threaded portion 212. Inner collar 206 is retained in the outer annular collar 202 by a snap ring 214 and sealed by an O-ring 215. A transverse passage 216 extends from the axial passage 208 of the inner collar 206 outwardly through the outer annular collar 202. A sleeve 218 having an end 220 is coupled to the inner collar 206 and extends inwardly toward the axle 194. A valve 226 having a valve face 228 mates with the valve seat 210. An axial passage 230 extending through the valve 226 receives the valve stem 232. An inner stop member 222 is attached to the valve stem 232 to act as a stop member for a spring 224. The inner stop member 222 is adjustably attached to the valve stem 232 by a set screw 223 which is able to reciprocate within a slot 225 in the sleeve 218. The position of the inner stop member 222 is adjustable on the valve stem 232 to select the proper spring compression of spring 224. The valve 226 is attached to the valve stem 232 by a set screw or other suitable means. The valve stem 232 extends through the axial passage 208 of the inner annular collar 206 and the sleeve 218. The upper end of the valve stem 232 is coupled to a cam follower assembly 234. The cam follower assembly 234 includes a roller 236 which contacts the cam surface 200. A pair of members 238 having an elongated U-shaped slot 240 are provided on either side of the roller 236. The U-shaped slot 240 receives the axle 194 as shown in FIG. 7.

In use, the drum and the valve assembly 192 rotate around the fixed axle 194 and cam 198. As the roller member 236 contacts the cam surface 200, the valve stem 232 is pushed downwardly toward the outer edge of the drum thereby unseating the valve 226 from the valve seat 210 to open the valve. Water from the interior of the drum flows through the transverse passage 216 through the valve and into the compartments 50. Water then flows through the probes 18 into the ground.

Figure 13:
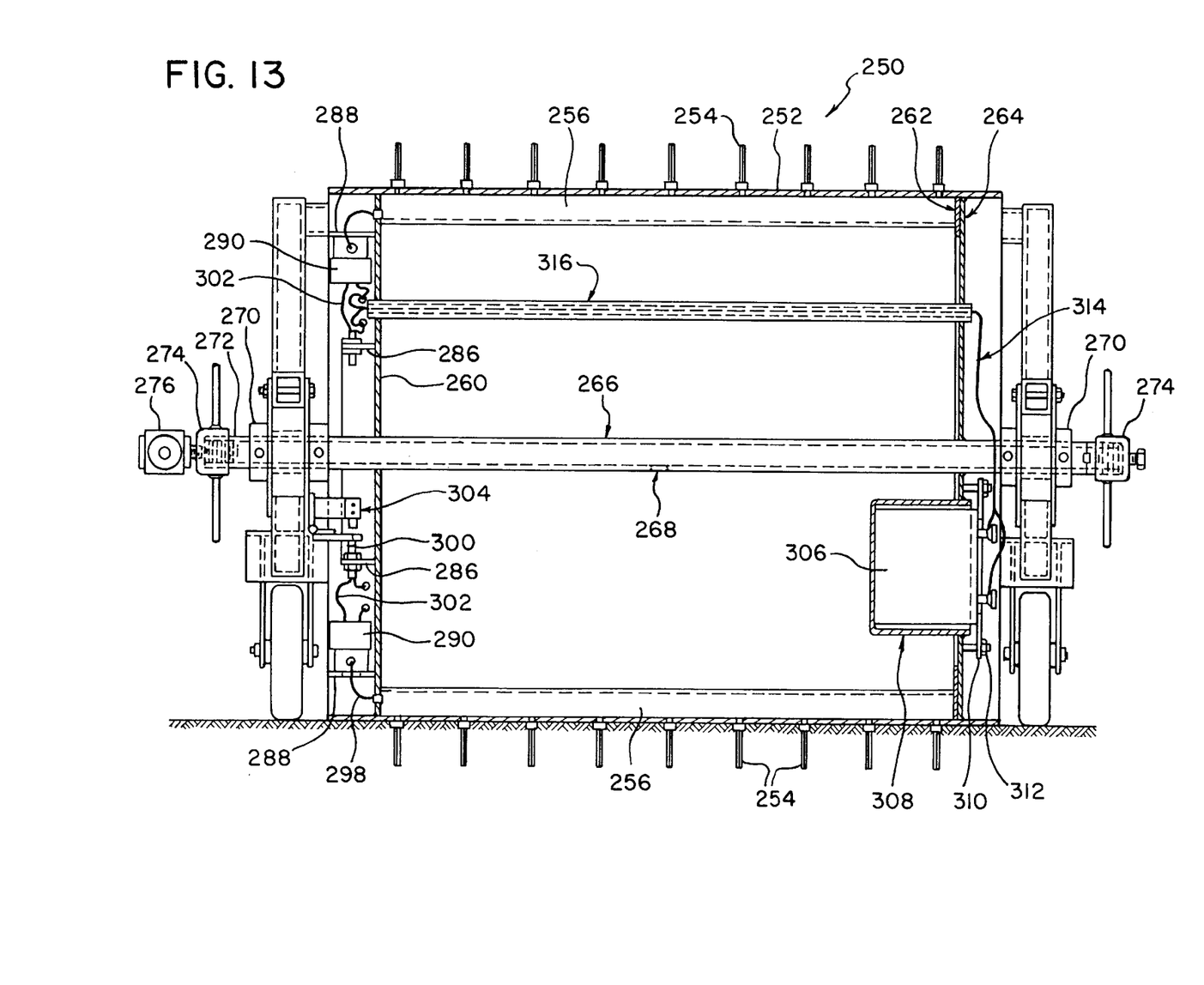
FIG. 13 is an end elevational view taken in partial cross section of the irrigation device and valve assembly in a further embodiment.
Figure 14:
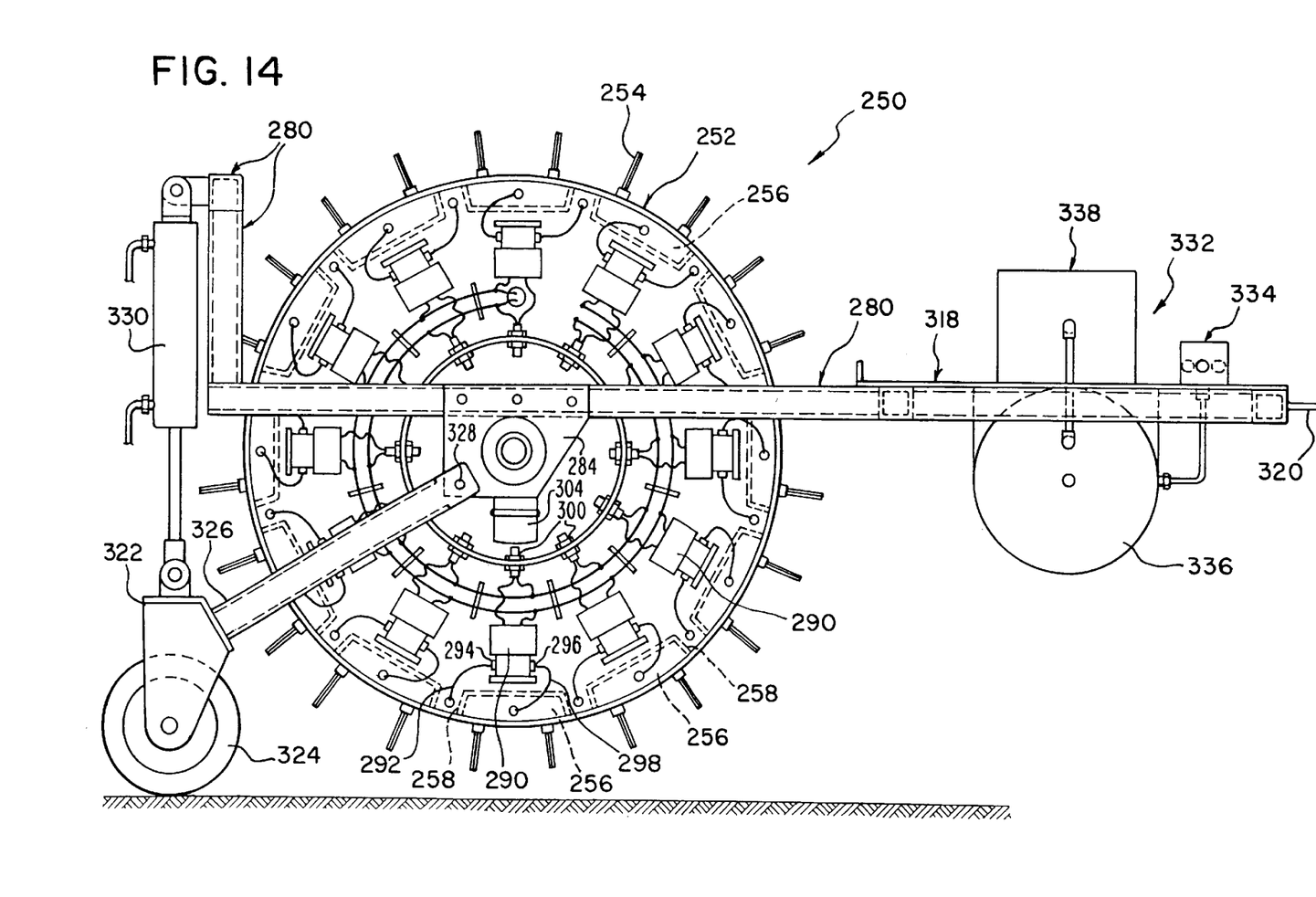
FIG. 14 is a side elevational view of the irrigation device of FIG. 13.
Figure 15:
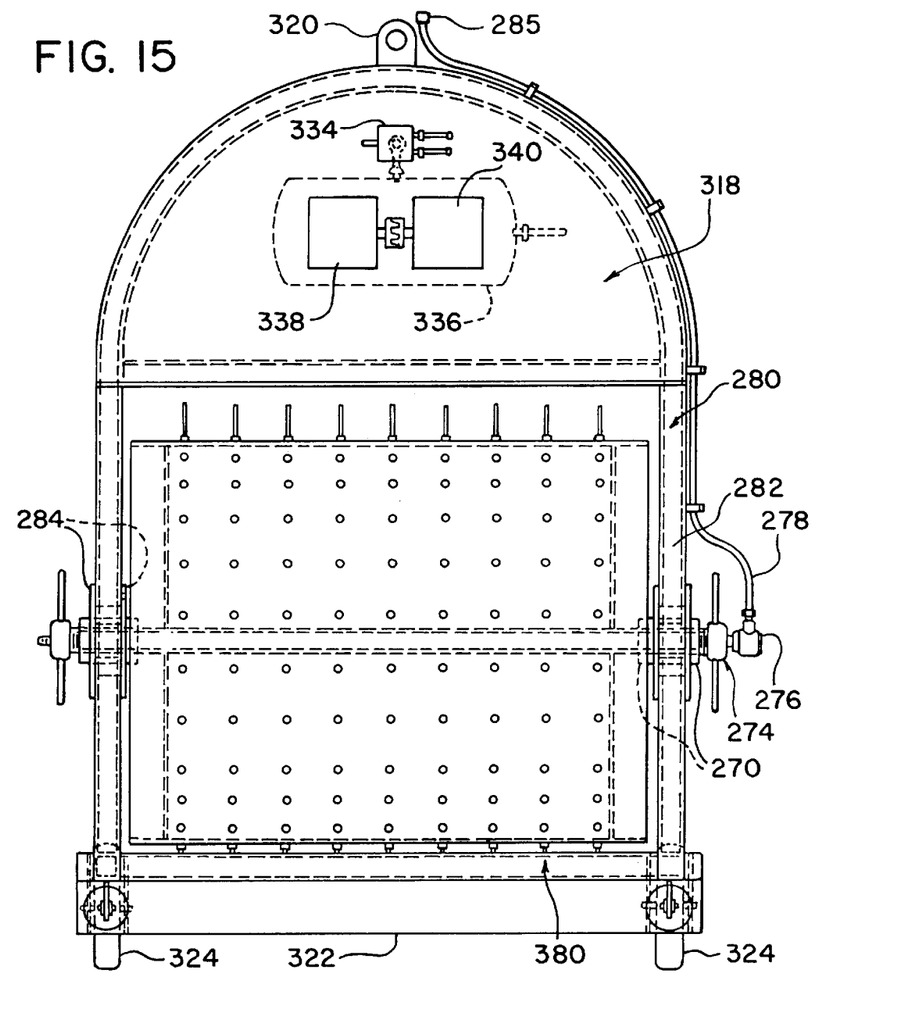
FIG. 15 is a top plan view of the irrigation device of FIG. 13.

Referring to FIGS. 13–15, a further embodiment of the invention is shown. The irrigation and aeration apparatus 250 includes a drum 252 having a plurality of water injecting probes 254 spaced along the outer surface of the drum. Inner compartments 256 are spaced along the inner surface of the drum to supply water to selected probes as in the previous embodiments. The compartments 256 are defined by substantially U-shaped troughs which are welded to the inner surface of the drum 252 and extend the full width of the drum.

The drum 252 includes a first side wall 260 and a second side wall 262. Second side wall 262 has an annular ring shape welded to the drum 252. An outer side wall 264 is secured to the second side wall 262 by suitable means such as, for example, welding. A hollow conduit passes through the center of the drum to supply water to the interior of the drum and serve as an axle 266 for the rotation of the drum. An opening 268 in the axle 266 supplies water to the interior of the drum. The outer edges of the axle 266 are coupled to bearings 270 to allow rotation of the axle 266 and the drum 252. In preferred embodiments, the axle 266 is welded to the side walls 260, 264 of the drum 252. The ends of the axle 266 include a threaded portion 272 for receiving an end cap 274 which is threaded to mate with the axle 266. A swivel coupling 276 is coupled to at least one of the end caps 274 to supply water to the drum. A supply conduit 278 is attached to the swivel coupling to supply water under pressure to the coupling and to the drum.

The drum 252 and axle 266 are supported by a frame 280 having rails 282 which extend along either side of the drum. A pair of plates 284 are attached to the rails 282 to support the axle 266. The supply conduit 278 is mounted along the rail 282 toward the leading end of the frame where it terminates at a suitable coupling 285 for a connection to a water source (not shown).

A ring shaped mounting plate 286 is attached to side wall 260 to surround the axle 266. Spaced radially outward from the ring shaped mounting plate 286 are a plurality of mounting plates 288. A solenoid valve 290 is mounted on each of the plates 288. A supply conduit 292 extends from the interior of the drum to the inlet 294 of each solenoid valve 290, the outlets 296 of the solenoid valves 290 are coupled to conduits 298 to supply water to the compartments 256. A plurality of proximity switches 300 are mounted to the ring shaped mounting plate 286. The proximity switches 300 are connected to the solenoid operated valves 290 by wires 302. An actuator or sending unit 304 is mounted on the frame 280. As shown, the sending unit 304 is mounted below the frame to cooperate with the proximity switches 300 to actuate the solenoid valves 290 when the valves are in their downwardmost position.

A power source 306, such as a battery, is housed in a well 308 extending through side wall 264. A clamping plate 310 secured by bolts 312 is attached to the side wall 264 to close the well 308. Wires 314 extend from the power source 306 through a conduit 316 to the proximity switches 300.

The frame 280 includes a platform 318 and a trailer hitch 320 at the leading end. The trailing end of the frame 280 includes a cross member 322 supporting a pair of wheels 324. A pair of arms 326 extend from the cross member 322 at an angle upwardly to the frame at pivotal connection 328. A pair of pneumatic cylinders 330 extend downwardly from the frame 280 to the straddling cross member 322. Pneumatic supply lines 332 extend from the pneumatic cylinders 330 to an air pressure supply. The air pressure supply 332 includes a four-way actuating valve 334 which is connected to an air tank 336. A compressor 338 and a power supply 340 are mounted on the platform 318 to supply air pressure to the tank 336. Operation of the actuating valve 334 raises and lowers the pneumatic cylinders 330 to raise and lower the frame 280 and the drum 252 with respect to the ground. In this manner, the drum can be lifted from the ground when not in use.

The apparatus of FIGS. 13 through 15 is particularly suitable for aerating and irrigating ground remote from a water source. The apparatus is towed by a suitable vehicle having a water supply which is fed to the supply conduit 278. The apparatus is operated by moving the drum over the ground with the probes engaging the soil and supplying water to the supply conduit. As the drum rolls over the ground, the proximity switch moves past the sending unit to actuate the solenoid valve to supply water from the drum to the compartments. The compartments then feed the water through the probes into the ground.

FIGS. 17–21 illustrate a further embodiment of the invention. The irrigation and aeration apparatus 400 is mounted on a frame (not shown in FIG. 18) similar to the frame shown in the embodiment of FIG. 1. The frame includes a suitable handle and wheels for moving the apparatus 400 to the desired location.

Figure 17:
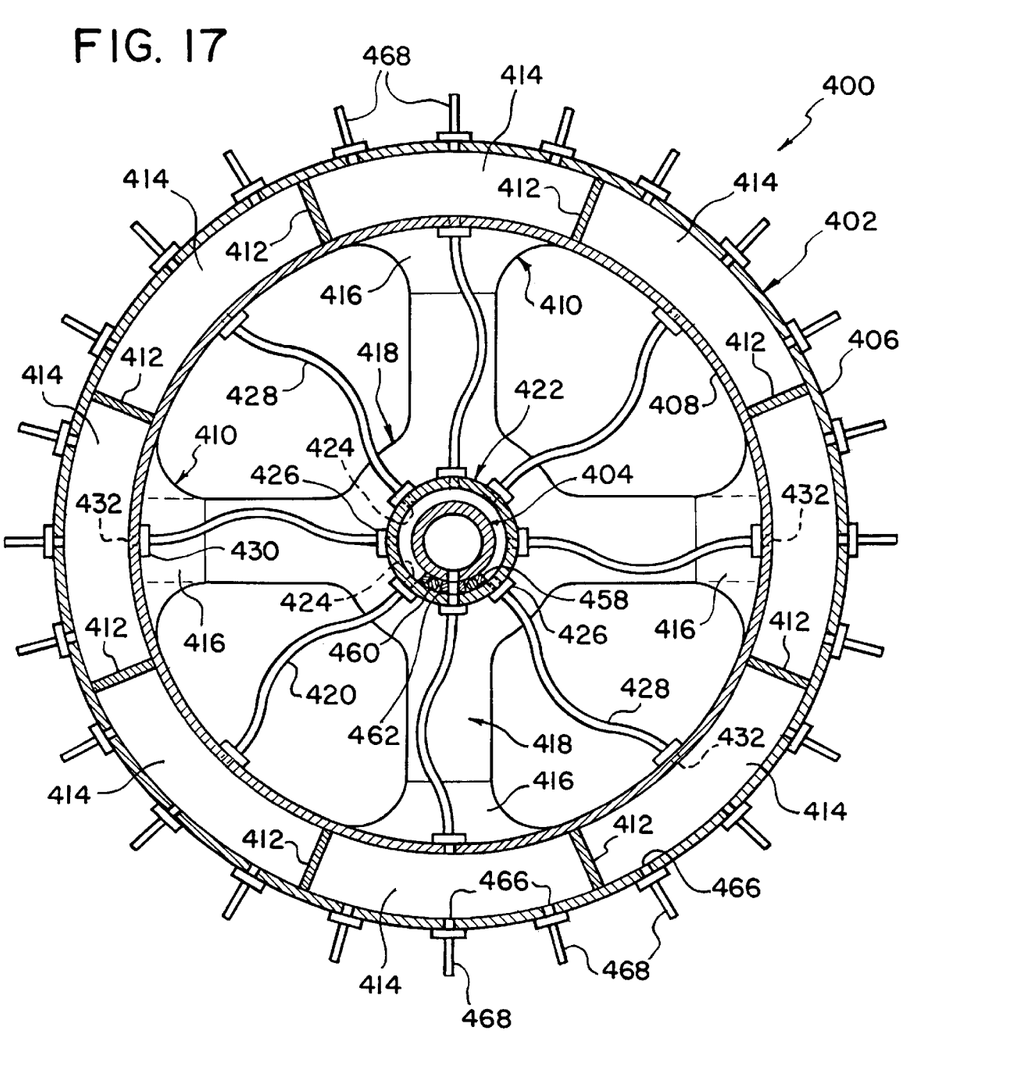
FIG. 17 is a cross-sectional end view showing a further embodiment of the drum and valve arrangement of the invention.
Figure 18:
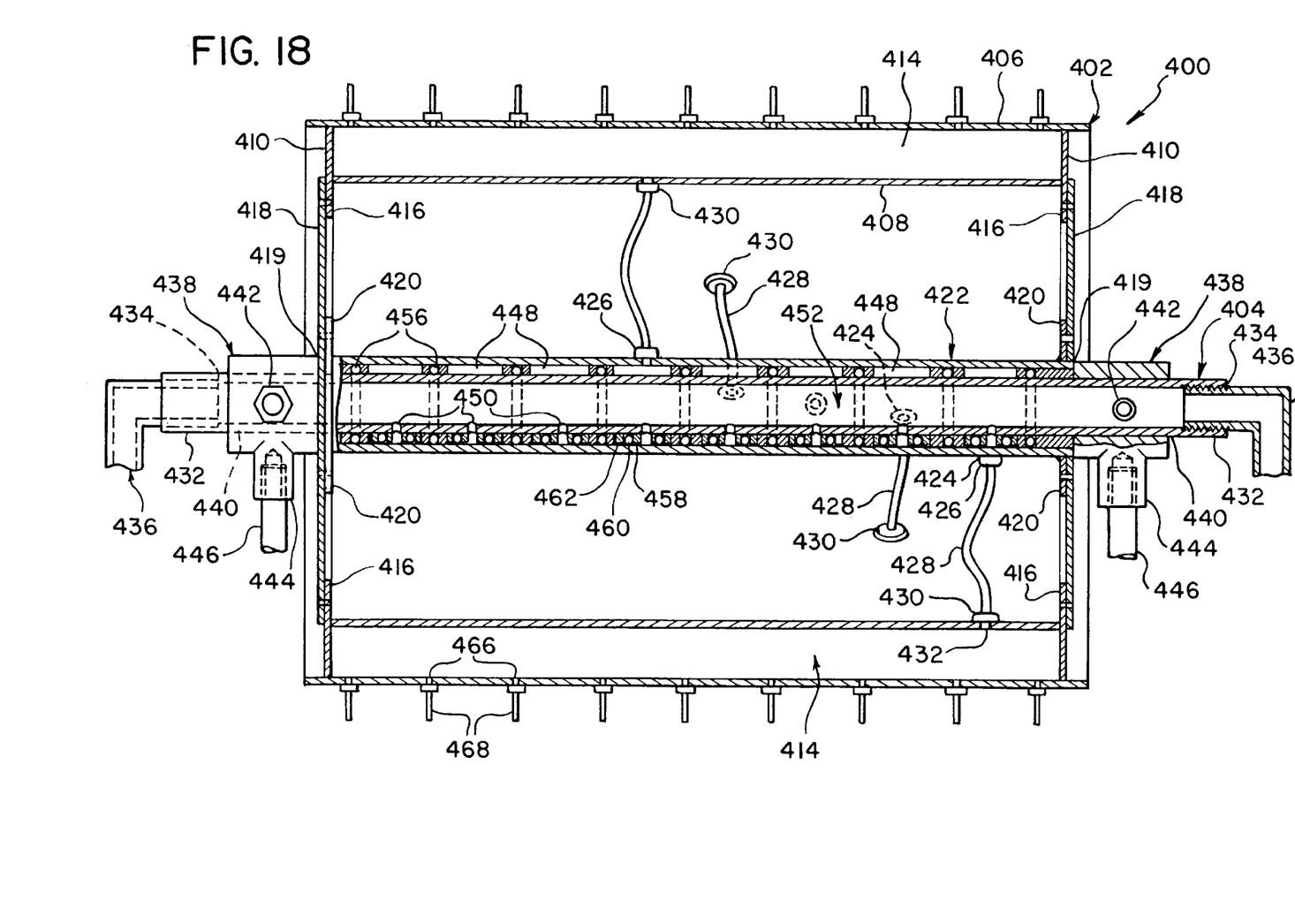
FIG. 18 is a partial cross-sectional front view of the drum and valve arrangement of the embodiment of FIG. 17.

The apparatus 400 includes a drum 402 rotatably mounted on a shaft 404. Referring to FIG. 17, the drum 402 includes an outer annular wall 406 and an inner annular wall 408 concentric to and spaced from the outer wall 406. End walls 410 as shown in FIG. 18 are attached to the outer wall 406 and inner wall 408. A plurality of compartment walls 412 extend radially between the inner and outer walls 406, 408 to define a plurality of compartments 414 spaced circumferentially around the drum 402.

In preferred embodiments of the invention, the end walls 410 and compartment walls 412 are attached to the inner and outer walls 408, 406 in a fluid tight manner to seal the compartments 414. The various components can be welded together or attached using a suitable adhesive or sealant.

End walls 410 include an inwardly extending tab portion 416 which are coupled to a spoked member 418. Spoked member 418 is provided with a central aperture 419 for receiving the shaft 404 as shown in FIG. 18. Spoke member 418 is coupled to the radially extending end flanges 420 of a central shaft 422 as shown in FIG. 18.

Central shaft 422 of the drum 400 includes a plurality of holes 424 for receiving a coupling 426. The coupling 426 is attached to a conduit 428 extending to a coupling 430 attached to an aperture 432 in the inner wall 408. As shown in FIG. 18, the holes 424 are formed in the central shaft 422 in a straight line and are spaced apart in a longitudinal direction with respect to the longitudinal axis of the central shaft 422. In preferred embodiments, each of the holes 424 are in the bottom side of the central shaft 422 and face downwardly with respect to the normal operating position of the drum.

As shown in FIG. 18, the drum 402 is mounted for rotation on the shaft 404. The shaft 404 is dimensioned to be received axially through the drum 402 with the opposite ends 432 extending therefrom. The ends 432 of the shaft 404 include an internally threaded portion 434 for coupling to a water supply elbow 436. A T-shaped coupling 438 having an axial passage 440 receives each end of the shaft 404 and is fixed to the shaft 404 by a bolt or screw 442. The coupling 438 at each end of the shaft 404 positions the drum 402 on the shaft 404 while allowing free rotation of the drum 402 with respect to the shaft 404. The coupling 438 includes a threaded member 444 extending radially therefrom for coupling with the frame 446 of the assembly 400.

Figure 19:
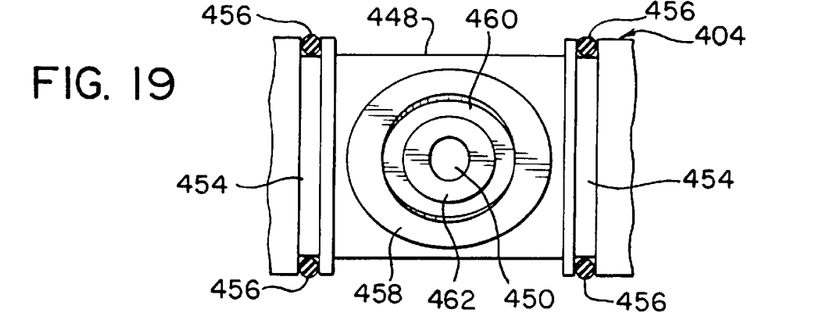
FIG. 19 is a partial bottom view of the water supply pipe of the embodiment of FIG. 17 showing the water outlet and seals on the pipe.
Figure 20:
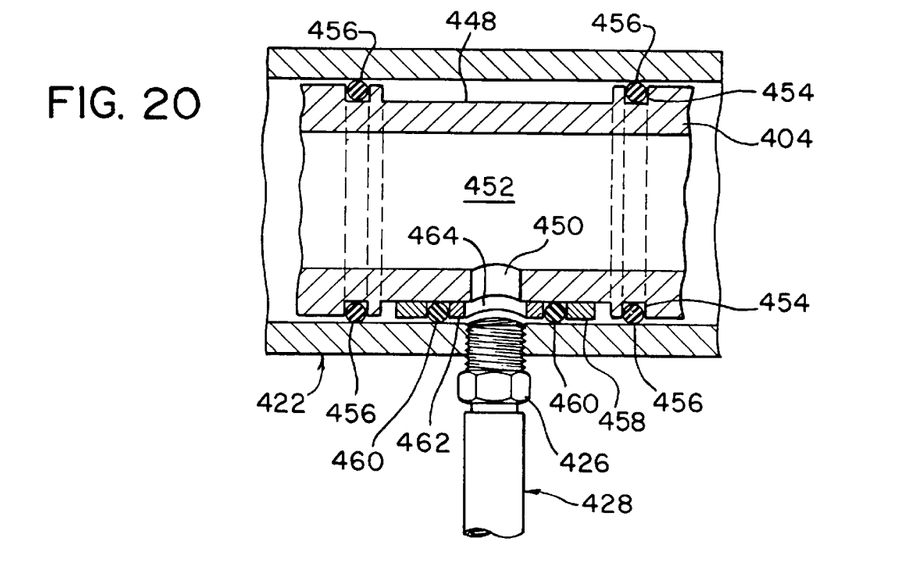
FIG. 20 is a partial cross-sectional view of the valve assembly of the embodiment of FIG. 17.
Figure 21:
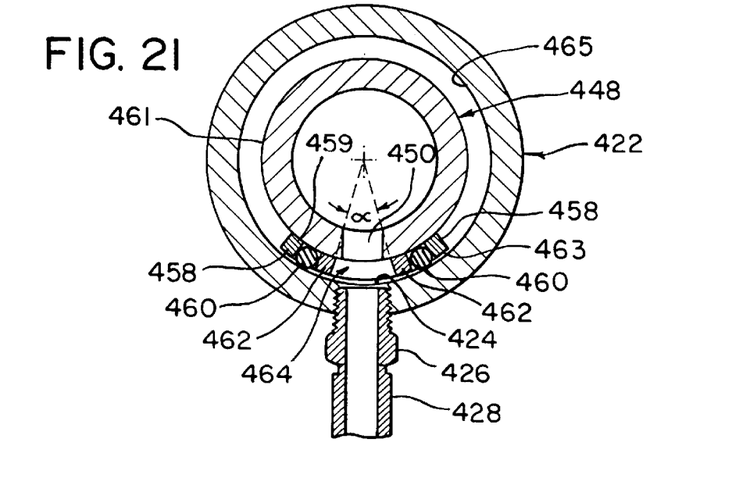
FIG. 21 is a partial cross-sectional view of the valve assembly of the embodiment of FIG. 17.

Referring to FIGS. 19–21, shaft 404 includes a plurality of recesses 448 extending around the circumference of the shaft 404. Each of the recesses 448 include an aperture 450 extending radially through the shaft into the hollow area 452 of the shaft 404. An annular groove 454 on each side of the recess 448 extends circumferentially around the shaft 404 adjacent each recess 408 and is dimensioned to receive a continuous flexible seal 456. The seal 456 in the preferred embodiment is an O-ring of neoprene rubber or other resilient material as known in the art. The O-ring 456 as shown in FIG. 20 is dimensioned to fit securely in the annular groove 454 and extends a slight distance beyond the surface of the shaft 404 to define a seal between the shaft 404 and the central shaft 422 of the drum 402.

As shown in FIG. 19, an outer annular ring-shaped member 458 surrounding the hole 450 is fixed to the shaft 404 with each recess 448 by suitable means such as by welding. As shown in FIG. 21, the annular member 458 has a curved inner surface 459 complementing the curvature of the outer surface 461 of shaft 448 and an outer surface 463 complementing the curvature of the inner surface 465 of central shaft 422. An annular seal 460, such as an O-ring, is seated within the fixed outer annular member 458 and is held in place by the outer annular member 458. A curved, substantially U-shaped inner annular ring 462 is seated within the central opening of the O-ring 460 to support the inner edge of the O-ring 460. In the embodiment illustrated, the inner annular ring 462 is not fixed to the shaft 404 and free-floating within the O-ring 460. The inner annular ring 462 has a central opening 464 that is dimensioned to complement the hole 450 in the shaft 404 and allow water to pass through. The O-ring 460 is dimensioned to form a seal surrounding the hole 450 between the recess 448 of the shaft 404 and the inner surface of the central shaft 422 of the drum 402. As shown in FIGS. 20 and 21, the opening 464 in the inner annular ring 460 is slightly larger than the hole 450. In alternative embodiments, the opening 464 is essentially the same size of the hole 450. The inner annular ring 462 has a curved inner and outer surface to complement the curvature of the outer surface 461 of shaft 448 and inner surface 465 of central shaft 422.

In preferred embodiments of the invention, eight compartments 414 are formed in the drum between the inner wall 408 and the outer wall 406. A corresponding number of recesses 448 and holes 450 are spaced along the length of the shaft 404 as shown in FIG. 18. The holes 450 are positioned in a downward direction with respect to the ground and are spaced along the length of the shaft 404.

In operation, a water source is provided to the coupling 436 which feeds the water through the shaft 404 to the holes 450. As the drum 402 is rolled over the ground, and rotates with respect to the shaft 404, the holes 424 in the central shaft 422 align with the holes 450 in the shaft 404 to feed water through the conduits 428 and to the respective compartment 414. The holes 450 in the shaft 404 are positioned in a downward direction so that the water is supplied to the compartments 414 only when the respective compartment is adjacent the ground. The outer wall 406 of the drum 404 includes a plurality of holes 466 receiving the probes 468. The probes 468 are preferably as shown in FIG. 9 for injecting the water into the ground.

As shown in FIG. 21, the opening 464 of the inner ring 462 is larger than the opening 450 in the shaft 404 so that water is able to flow through the coupling 426 throughout an angle of rotation a of the drum 402 with respect to the shaft 404. The dimension of the opening 464 can be selected to determine the length of time and angle of rotation that the coupling 426 is in communication with the hole 450 and the amount of water supplied to the compartments with each rotation of the drum. The dimension of the opening 464 in the ring 462 defines the dispensing cycle of water to a compartment and enables the dispensing cycle of adjacent compartments to partially overlap. In this manner, the water dispensing cycle of one compartment can be initiated before the dispensing cycle of the adjacent compartment is fully completed. In preferred embodiments of the invention, the dispensing cycle begins as the probes of a respective compartment first engage the ground and end as the probes are withdrawn from the ground.

While advantageous embodiments have been chosen to illustrate the invention, it will be understood by those skilled in the art that various changes and modifications can be made therein without departing from the scope of the invention as defined in the appended claims.

What is claimed is:

1. A soil irrigation and aeration device comprising:
a rotatable ground engaging drum having an outer wall, an inner wall defining a central chamber and being spaced from said outer wall, and a plurality of compartments disposed between said inner and outer walls around a circumference of said drum, said compartments having a length substantially equal to a length of said drum;
a plurality of probes extending radially outward from an outer surface of said drum, each of said probes having a cylindrical side wall defining a substantially tubular shape with a slot in said side wall extending longitudinally from a first inner end in communication with an interior of one of said compartments to a second open outer end, each of said probes having an open inner axial face and an open outer axial face;
a water source connected to said central chamber in said drum; and
a valve assembly and water connection coupled to each of said inner walls of said compartments for selectively supplying water under pressure from said central chamber and water source to said inner walls and compartments sequentially when said probes engage the ground, thereby injecting water to the probes engaging the ground.

2. The device of claim 1, wherein said probes comprise a spring pin extending through an outer wall of said drum into said compartment.

3. The device of claim 2, wherein said probes further comprise a coupling threadedly connected to the outer surface of said drum, and wherein said spring pin is press fitted into said coupling.

4. The device of claim 1, wherein said probes comprise a first spring pin having a first end press fitted into an aperture in the outer surface of said drum, and a second spring pin having a first end press fitted into a second of said first spring pin.

5. The device of claim 1, wherein said water source comprises a control valve and a flow meter.

6. The device of claim 1, further comprising multiple side by side ground engaging wheels.

7. The device of claim 2, further comprising a plurality of spikes extending radially outward from said drum and spaced from said probes.

8. The device of claim 1, wherein each of said valve assemblies comprises:
at least one valve for supplying water from said water source to said compartments;
an actuator rod having a first end coupled to said valve and a second end extending radially toward said drum; and
a ground engaging foot extending from the outer surface of said drum and being coupled to said second end of said actuator rod, wherein rotation of said drum depresses said foot when said foot engages the ground to open said valve and supply water to said chamber.

9. The device of claim 8, wherein each of said valve assemblies further comprises a spring member to spring bias said valve to a closed position.

10. The device of claim 1, wherein said water source comprises a stationary hollow shaft extending axially through said drum and having at least one opening for supplying water to said central chamber of said drum;
a plurality of cam members on said shaft, each cam extending downwardly toward said outer surface of said drum; and
said valve assembly comprising a plurality of valves for supplying water from said central chamber to said compartments, and an actuator rod having a first end coupled to said valve and a second end for engaging one of said cam members and selectively opening said valve as said drum compartment passes over the ground.

11. The device of claim 1, wherein said valve assembly comprises a solenoid actuated valve for selectively controlling water supply to each of said compartments, and a control means for controlling and actuating each of said valves for selectively supplying water to said compartments.

12. A soil irrigation and aeration device comprising:
a frame;
a ground engaging drum rotatably mounted on said frame, said drum having an outer wall, an inner wall spaced from said outer wall and a plurality of compartments disposed circumferentially around said drum between said inner and outer walls, said compartments having a length substantially equal to a length of said drum;
a water source for supplying water to each of said compartments;
each of said compartments having a valve assembly and water connection coupled to said inner wall and connected to said water source for selectively supplying water to said compartments when each of said compartments are adjacent the ground;

a plurality of probes extending radially outward from said outer wall of said drum, each of said probes having a substantially tubular shape with a slot extending along a side wall and extending longitudinally from a first open axial end in communication with one of said compartments to a second open axial outer end for penetrating the soil and injecting water into a cavity formed by said probes penetrating the soil.

13. The soil irrigation device of claim 12, further comprising multiple side by side ground engaging wheels coupled to said frame, and height adjustment means coupled to said wheels for raising and lowering said drum with respect to the ground.

14. The soil irrigation device of claim 12, wherein said drum further includes a plurality of spikes extending radially outward and spaced-apart from said probes.

15. The soil irrigation device of claim 12, wherein said probes are spring pins, and said drum includes a plurality of holes having said spring pins press fitted therein.

16. The device of claim 12, wherein said valve assembly comprises:

at least one valve for supplying water from said water source to said compartments;

an actuator rod having a first end coupled to said valve and a second end extending radially outward toward said drum; and a ground engaging foot extending from the outer wall of said drum and being coupled to said second end of said actuator rod, wherein rotation of said drum depresses said foot when said foot engages the ground to actuate said valve and supply water to said chamber and probes.

17. The device of claim 16, wherein said valve assembly further comprises a spring member to spring bias said valve to a closed position.

18. The device of claim 12, wherein said water source comprises a stationary hollow shaft extending axially through said drum and having at least one opening for supplying water to a central chamber of said drum;

a plurality of cam members on said shaft, each cam member extending downwardly toward said outer wall of said drum; and said valve assembly comprising a plurality of valves for supplying water from said water source to said compartments, and an actuator rod having a first end coupled to said valve and a second end for engaging one of said cam members and selectively opening said valve as said drum passes over the ground.

19. The device of claim 18, wherein said cam members are spaced-apart along said shaft and projecting downwardly toward the ground whereby said valves are actuated when adjacent the ground.

20. The device of claim 12, wherein said valve assembly comprises a solenoid actuated valve for selectively controlling water supply to each of said compartments, and a control means for controlling and actuating each of said valves for selectively supplying water to said compartments.

21. The device of claim 20, further comprising a solenoid actuating member coupled to said frame, and a plurality of proximity switches mounted on said drum, said proximity switches being connected to said solenoid valves and being positioned on said drum to be sequentially actuated by said actuating member during rotation of said drum.

22. A soil irrigation and aeration device comprising:

a frame having a hollow, fixed first shaft mounted on said frame and coupled to a water supply, said first shaft having a plurality of holes extending radially through said shaft for dispensing water, each of said holes extending in a downward direction with respect to the ground and being spaced in a line extending longitudinally along a longitudinal axis of said first shaft;

a ground engaging drum having a hollow centrally located second shaft rotatably mounted on said first shaft, said second shaft having a plurality of longitudinally spaced-apart holes for cooperating with a respective hole in said first shaft, wherein said holes in said second shaft align with a cooperating hole in said first shaft during a predetermined angle of rotation of said second shaft with respect to said first shaft for dispensing water through said holes;

said drum further including an outer wall and an inner wall spaced from said outer wall, a plurality of radial walls extending from said inner wall to said outer wall and defining a plurality of circumferentially disposed compartments, each of said compartments having a length substantially equal to a length of said drum, said inner wall having at least one aperture communicating with each of said compartments;

a plurality of conduits, each conduit having a first end coupled to one of said apertures communicating with one of said compartments, and a second end coupled to one of said apertures in said second shaft for supplying water to said compartment;

a plurality of first annular seals mounted around said first shaft, each of said first annular seals disposed on opposite sides of said holes in said first shaft, said first seals forming a substantially fluid tight seal between said first and second shafts; and a plurality of probes extending radially outward from an outer surface of said drum, said probes having a cylindrical side wall defining a substantially tubular shape with a slot in said side wall extending longitudinally from a first inner end in communication with an interior of one of said compartments to a second open outer end for injecting water into the ground.

23. The assembly of claim 22, wherein said first shaft comprises a plurality of spaced-apart annular grooves extending circumferentially around said first shaft, and said first annular seals being received in said annular grooves.

24. The assembly of claim 23, wherein said first shaft further comprises a plurality of annular recesses extending circumferentially around said first shaft, each of said recesses being disposed between adjacent first annular seals, and said holes in said first shaft being positioned within said annular recesses;

each said annular recess having an outer annular ring surrounding said hole in said first shaft and fixed to said shaft;

an inner annular ring positioned concentric to said outer annular ring; and a second annular seal positioned between said outer and inner annular rings for forming a seal between said recess and an inner surface of said second shaft.

25. The assembly of claim 22, wherein said probes comprise a spring pin extending through an outer wall of said drum into said compartment.

* * * * *